Figures 1, 2:
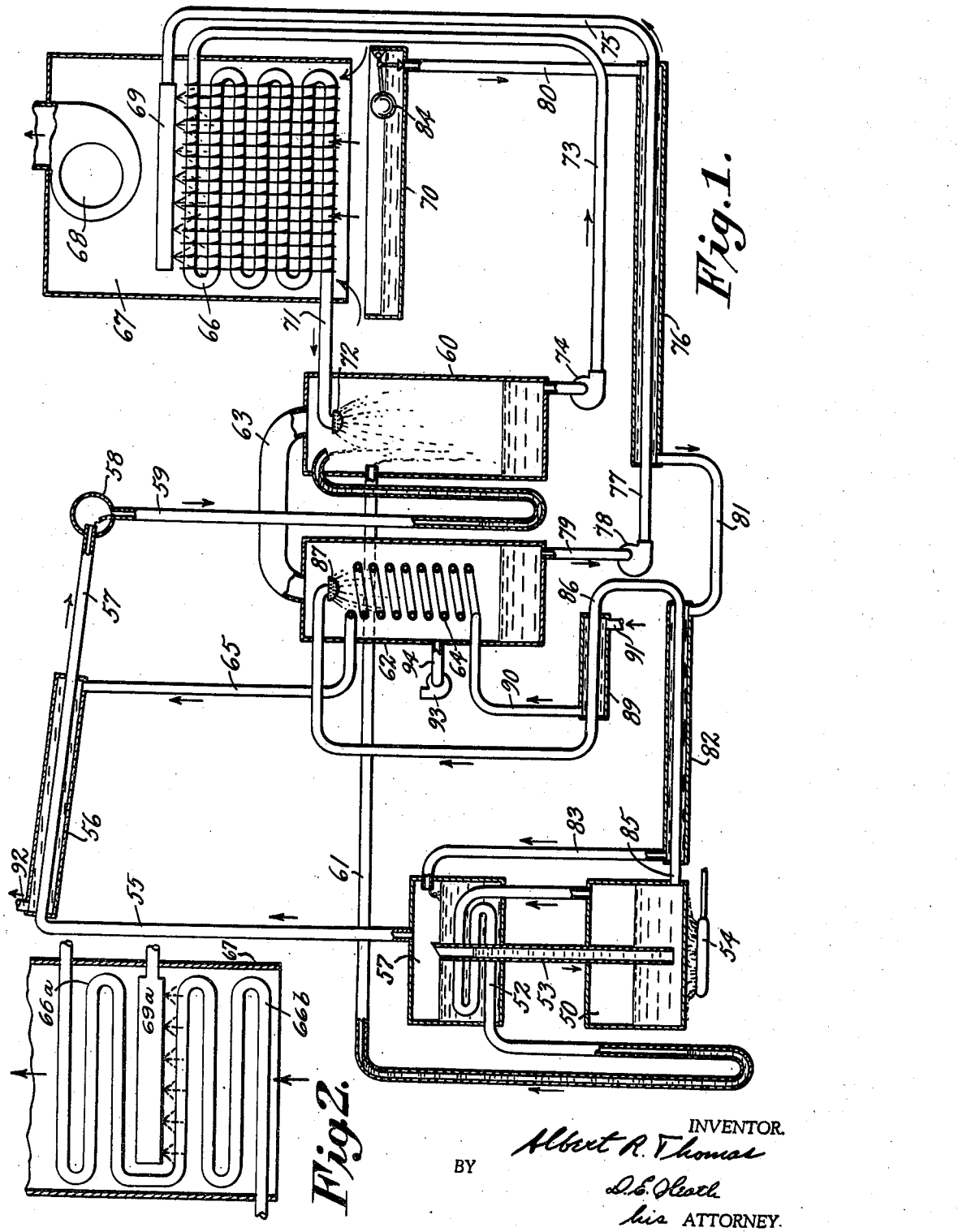

June 8, 1943. A. R. THOMAS 2,321,115
AIR CONDITIONING
Filed Feb. 6, 1940

INVENTOR.
Albert R. Thomas
BY D. E. Heath
his ATTORNEY.

Patented June 8, 1943

2,321,115

UNITED STATES PATENT OFFICE 2,321,115

AIR CONDITIONING

Albert R. Thomas, Evansville, Ind., assignor to Servel, Inc., New York, N. Y., a corporation of Delaware Application February 6, 1940, Serial No. 317,478

9 Claims. (Cl. 62—129)

My invention relates to cooling and dehumidification of air.

It is an object of the invention to provide a simple method and apparatus affording independent control of temperature and humidity of air being conditioned. It is another object of the invention to carry out cooling and dehumidification of air with the use of a refrigeration system operating under conditions favorable to efficiency of operation of the system.

It is known to use refrigerating systems for cooling air, and water removal is obtained to a degree depending on the temperature to which the air is cooled. Desirable conditions are not obtained by simply cooling the air because the cooled air may have a high relative humidity. The desired relative humidity has been obtained by cooling and then re-heating, but this requires a low refrigerating temperature, and re-heating is not economical. Dehumidification of air can be obtained by direct absorption of water in an open system, but this alone results in high temperature of the air from the absorber. Water removal by absorption and cooling by refrigeration will give the desired conditions, but requires considerable plant equipment.

In simple refrigeration, water is condensed on heat transfer surfaces at a temperature below the desired saturation temperature of the air. One factor in the present invention is the use of higher temperature heat transfer surfaces with an absorbent interposed between the air and heat transfer surface so that water can be condensed above the saturation temperature. The work done by the refrigerating system which is operating at the higher evaporator temperature is therefore reduced, and a desirable balance between temperature and moisture is obtained by adjusting temperature of the heat transfer surface or the concentration of the absorbent.

The invention will be more fully understood upon reference to the following description and the accompanying drawing forming part of this specification, and of which:

Fig. 1 shows more or less diagrammatically an air conditioning system embodying the invention; and Fig. 2 illustrates a modified embodiment of the invention.

Referring to Fig. 1, a generator comprises a lower compartment 50 and an upper compartment 51. In compartment 51 is a coil 52 having one end connected to the top of lower compartment 50. A conduit 53 connects the upper part of compartment 51 to the lower part of compartment 50. The lower compartment 50 is heated by a suitable heater such as a gas burner 54.

The upper part of compartment 51 is connected by a conduit 55 to the inlet of a water cooled condenser 56. The outlet of condenser 56 is connected by a conduit 57 to a vessel 58. Vessel 58 is connected by a conduit 59 to an evaporator 60. Conduit 59 is provided with a downward loop which acts as a liquid trap. The other end of generator coil 52 is connected by a conduit 61 to the evaporator 60. Conduit 61 is provided with a downward loop forming a liquid trap. Evaporator 60 is connected to an absorber 62 by a conduit 63. A water cooling coil 64 is located in absorber 62. The upper end of coil 64 is connected by a conduit 65 to the jacket of water cooled condenser 56.

A finned air cooling coil 66 is located in an air duct 67. A fan or blower 68 is arranged to cause flow of air through duct 67 in the direction of the arrows. Above coil 66 is a liquid spray head 69. Below coil 66 is a liquid catch pan 70. The lower end of coil 66 is connected by a conduit 71 to a spray head 72 in the upper part of evaporator 60. The other end of coil 66 is connected by a conduit 73 to the bottom of evaporator 60. In conduit 73 is a liquid pump 74 arranged to cause flow of liquid from the bottom of evaporator 60 through conduit 73 toward coil 66. Spray head 69 is connected by a conduit 75, liquid heat exchanger 76, conduit 77, liquid pump 78 and conduit 79 to the bottom of absorber 62. Pump 78 is arranged to cause flow of liquid from the bottom of the absorber to the spray head 69. Catch pan 70 is connected by a conduit 80, liquid heat exchanger 76, conduit 81, liquid heat exchanger 82, and a conduit 83 to the upper generator compartment 51. A float valve 84 controls the connection between conduit 86 and pan 70. Generator compartment 50 is connected by a conduit 85, a liquid heat exchanger 82, and conduit 86 to a spray head 87 in the top of absorber 62 above cooling coil 64. A water cooling jacket 89 is located around a part of conduit 86. The outlet of jacket 89 is connected by a conduit 90 to the lower end of absorber cooling coil 64. A vacuum pump 93 is connected by a conduit 94 to absorber 62.

In the above described system the absorption liquid may be lithium chloride or lithium bromide solution and the refrigerant water. Burner 54 heats generator compartment 50. The liquid pumps 74 and 78 are operated. Blower 68 is operated to cause circulation of air through duct 67 over coil 66. Cooling water is admitted through a conduit 91 and flows through jacket 89, conduit 90, absorber cooling coil 64, conduit 65, condenser jacket 56, and flows to waste through conduit 92. Steam is expelled from solution by heat in generator compartment 50, weakening the solution in this compartment. The steam flows into coil 52 and condenses due to heat transfer to solution in compartment 51. Heat transferred to solution in compartment 51 causes expulsion of steam which flows through conduit 55 to condenser 56. Steam cooled by water in condenser 56 liquefies and the water flows through conduit 57, vessel 58, conduit 59, into evaporator 60. Water fills the trap in conduit 59 before overflowing into evaporator 60. Water formed by condensation of steam in coil 52 flows through conduit 61 to evaporator 60. Water fills the trap in conduit 61 before overflowing into evaporator 60.

Due to the action of absorber 62, the pressure is lower in evaporator 60 than in the condenser and generator so that liquid columns are formed in the traps in conduits 59 and 61.

Water is sprayed into evaporator 60 from spray head 72. This water together with water which enters through conduits 59 and 61 evaporates, producing a refrigeration effect which lowers the temperature of the water. The cooled water is pumped from the bottom of evaporator 60 by pump 64 through conduit 73 and cooling coil 66 and thence through conduit 71 back to the spray head 72. Water vapor flows from evaporator 60 through conduit 63 to absorber 62.

Weakened solution flows from generator compartment 50 through conduit 85, heat exchanger 82, and conduit 86, to spray head 87 from which it descends through the absorber over the water cooling coil 64. Water vapor is absorbed into solution in the absorber. The enriched solution is pumped from the bottom of the absorber 62 by pump 78 to the spray head 69. The solution descends from spray head 69 downward over the outer surfaces of coil 66 so that the solution is interposed between the heat transfer surfaces of coil 66 and the air being cooled.

Below coil 66, solution is collected in pan 70 and flows under the control of float valve 84 through conduit 80, heat exchanger 76, conduit 81, heat exchanger 82, and conduit 83 to the upper generator compartment 51. Solution covers the steam coil 52 in compartment 51 and overflows through conduit 53 into lower compartment 50.

Vacuum pump 93 is operated when necessary to remove air or other inert gas from the closed part of the system. Liquid descending through absorber 62 also gathers inert gas which is pumped with liquid from the bottom of the absorber by pump 78 to spray head 69 and thence to atmosphere.

The column of liquid formed in the trap in conduit 61 must be of a height at least as great as the distance of spray head 87 above the surface level of liquid in lower generator chamber 50 so that pressure in chamber 50 can raise weakened absorption liquid through the above described path of flow into the absorber. Weakened absorption liquid flowing to the absorber is cooled by solution flowing to the generator through heat exchanger 82, and is also cooled by inlet cooling water in cooling jacket 89.

Due to the higher concentration of water in solution in generator chamber 51, the pressure is correspondingly less in this chamber than in the lower chamber 50. The liquid column standing in pipe 53 balances the pressure difference between generator chambers 50 and 51. The liquid column formed in the trap in conduit 59 balances the pressure difference between generator chamber 51 and evaporator 60. The sum of the heights of the liquid columns in pipe 53 and the trap in conduit 59 must equal the height of the liquid column in the trap in conduit 61, since the latter column alone, and the first two columns in series, are interposed between the pressure in the generator chamber 50 and the lower pressure in evaporator 60.

Air flowing through duct 67 flows upward over coil 66 and is reduced in temperature toward the temperature of cold water from evaporator 60 entering the upper end of coil 66. The partial pressure of water vapor in the air approaches the partial pressure of vapor of water in solution on the surface of coil 66.

Following the absorption liquid in its circuit, the absorbent contains the least amount of water where it leaves the lower generator chamber 50 through conduit 85 because it is here leaving the highest temperature and pressure zone of vapor expulsion. In the asorber 62, the absorption liquid absorbs a quantity of water vapor per unit of time which represents the amount of water evaporated in that length of time in the production of refrigeration for cooling water which flows through the cooling coil 66. On the surface of coil 66, the absorption liquid absorbs a further quantity of water vapor when the moisture content of the air is above the desired value. The quantity of water vapor absorbed from air on the surface of coil 66 in a given length of time represents in its heat content above the corresponding heat content at saturation, the saving in refrigeration that would be required to produce air of the same humidity by refrigeration alone.

As water flows downward through coil 66, its tempertaure increases, so that there is a rising temperature gradient from the top to the bottom of coil 66. For a given size refrigeration apparatus the effective extent of coil 66 may be increased at the higher temperature end, the effectiveness for dehumidification being maintained by flowing absorption liquid over only the lower or higher temperature part of the coil. Such a modification is illustrated in Fig. 2.

In Figs. 1 and 2 like parts are indicated by like reference numerals. The coil 66 in air duct 67 is divided into an upper section 66a and a lower section 66b. Air flowing upward in duct 67 flows over first the coil section 66b and then the coil section 66a. The water flows first through the upper section 66a and then through the lower section 66b. The direction of air flow is therefore generally counter-current to the direction of flow of the cooling fluid. Liquid absorbent and water vapor is introduced by a spray head 69a so that it descends only over the lower coil section 66b. As the cooling water flows through first coil section 66a and then through coil section 66b it increases in temperature due to heat transfer from the air so that coil section 66b is at a temperature above that of section 66a. The heat of dilution of the absorbent upon absorption of water vapor, being available at a temperature above the saturation temperature of the air, this heat can be transferred to the high temperature coil section 66b while the air is cooled to the desired temperature by the incoming cooling fluid in coil section 66a.

Various changes and modifications may be made within the scope of the invention as set forth in the following claims.

What is claimed is:

1. A system for conditioning temperature and moisture content of air including means for flowing air, means for flowing cooling fluid in thermal transfer relation with the air and counter-current to the direction of air flow, and means for flowing moisture absorbing fluid in contact with and counter-current to the direction of air flow and through only the portion of the heat transfer path from air to the cooling fluid toward the direction from which the air flows.

2. A method of conditioning temperature and humidity of air which includes flowing air to be conditioned, flowing cooling fluid in heat transfer relation with and counter-current to the air, flowing water absorbing fluid in contact with and counter-current to the air, and interposing the flowing absorbent in only the part of the path of heat transfer from the air to the cooling fluid that is toward the direction from which the air flows.

3. A system for conditioning temperature and humidity of air which includes an absorption type refrigeration system containing water as refrigerant fluid, and a liquid absorbent for water and including a generator, an absorber, and a cooling element, means for flowing air to be conditioned in thermal exchange relation with said cooling element, and means for flowing absorption liquid from said absorber in physical contact with the air and thermal transfer relation with said cooling element and thence to said generator.

4. A system as set forth in claim 3 in which said cooling element comprises an evaporator connected to said absorber, a heat transfer coil, means for circulating water through and between said evaporator and said coil, the air to be conditioned flowing in heat transfer relation with said coil.

5. A system for conditioning temperature and humidity of air which includes a circuit for moisture absorbing liquid, means of flowing air to be conditioned in contact with absorbent in one part of said circuit, means for expelling moisture from the absorbent in another part of said circuit, and means for cooling air in contact with said absorbent including a water evaporator connected to said circuit so that water vapor from the evaporator is absorbed by liquid in the circuit.

6. A system for cooling and dehumidifying air which includes an absorption type refrigeration system containing water as refrigerant fluid, and a liquid absorbent for water, and including a generator, an absorber, and a cooling element having different parts thereof at different temperatures, said cooling element being arranged for flow of air to be conditioned in thermal exchange relation first with a higher temperature part and then with a lower temperature part, and conduits for directing absorption liquid from said absorber into physical contact with the air and thermal transfer relation with said higher temperature part and thence to said generator.

7. A system for cooling and dehumidifying air which includes a circuit for moisture absorbing liquid, a part of said circuit being exposed for contact of air to be conditioned with said absorbent, an expeller in which moisture is expelled from the absorbent in another part of said circuit, and a cooler having a part for cooling air in contact with said absorbent, and a lower temperature part for cooling air after contact with said adsorbent, said cooler including a water evaporator connected to said circuit so that water vapor from the evaporator is absorbed by liquid in the circuit.

8. A system for cooling and dehumidifying air including a cooler having different parts at different temperatures arranged so that air to be conditioned flows in heat transfer relation first with a higher temperature part and then with a lower temperature part, and a conduit for directing moisture aborbing liquid into heat transfer relation with only said higher temperature part for contact with air while the latter is in heat transfer relation with said higher temperature part.

9. A system for cooling and dehumidifying air including a cooler having a gradient temperature from one part thereof to another and arranged so that air to be conditioned flows in heat transfer relation therewith in the decreasing direction of the gradient, and a conduit for directing moisture absorbing liquid into heat transfer relation with only the warmest part of said cooler and in contact with air flowing in heat exchange relation with such part.

ALBERT R. THOMAS.